United States Patent [19]
Stroud

[11] Patent Number: 5,296,778
[45] Date of Patent: Mar. 22, 1994

[54] THREE-FOUR ALTERNATOR COIL WINDING WITH ASSOCIATED HEAT SINKS

[76] Inventor: Leburn W. Stroud, 6546 Baker Blvd., Fort Worth, Tex. 76118

[21] Appl. No.: 906,512

[22] Filed: Jun. 30, 1992

[51] Int. Cl.$^5$ .................. H02K 11/00; H02K 3/00; H02J 7/14
[52] U.S. Cl. ................... 310/68 D; 310/64; 310/179
[58] Field of Search ............. 310/68 D, 68 R, 64, 310/65, 179, 184, 198, 208; 320/15, 92

[56] References Cited

U.S. PATENT DOCUMENTS

| | | | |
|---|---|---|---|
| 3,770,976 | 11/1973 | Stroud et al. | 307/10 R |
| 4,161,683 | 7/1979 | Stroud et al. | 322/87 |
| 4,330,715 | 5/1982 | Stroud et al. | 307/10 R |
| 4,336,485 | 6/1982 | Stroud | 320/15 |
| 4,347,473 | 8/1982 | Stroud | 320/15 |
| 4,354,127 | 10/1982 | Stroud | 310/198 |
| 4,356,418 | 10/1982 | Stroud | 310/184 |
| 4,454,464 | 6/1984 | Stroud | 322/28 |
| 4,509,005 | 4/1985 | Stroud | 320/68 |
| 4,543,504 | 9/1985 | Iwaki et al. | 310/68 D |
| 4,549,106 | 10/1985 | Stroud | 310/184 |
| 4,720,645 | 1/1988 | Stroud | 310/68 D |
| 4,952,915 | 8/1990 | Jenkins et al. | 340/639 |
| 5,043,614 | 8/1991 | Yockey | 310/68 D |

*Primary Examiner*—R. Skudy
*Assistant Examiner*—D. R. Haszko
*Attorney, Agent, or Firm*—Arthur F. Zobal

[57] ABSTRACT

The stator of the alternator has a delta winding with each winding having twelve coils. Three diode bridges are provided with each bridge being connected to the junction of two of the windings. Each bridge has four positive diodes connected in parallel and four negative diodes connected in parallel. Two of the positive diodes of each bridge and two of the negative diodes of each bridge are connected to a first output member and the other two positive diodes and the other two negative diodes of each bridge are connected to a second output member. Two heat sink plates are connected to the inside of one wall of the alternator housing and a third heat sink plate is connected to the outside of the wall. Each plate supports diodes from three of the bridges.

8 Claims, 7 Drawing Sheets

THREE-FOUR ALTERNATOR COIL WINDING WITH ASSOCIATED HEAT SINKS

BACKGROUND OF THE INVENTION

1. Field of the Invention

The invention relates to an alternator for use in a motor vehicle.

2. Description of the Prior Art

My U.S. Pat. Nos. 4,161,683; 4,336,485; 4,347,473; 4,354,127; 4,356,418; 4,330,715; 4,454,464; 4,549,106; 4,509,005; and 4,720,645 disclose different types of alternators and systems for supplying power.

Another prior art alternator has been used to supply power to emergency vehicles, however, problems have occurred in the use of such an alternator for this purpose. For example, the current output of the prior art alternator was not sufficient and diode bridge failure occurred as a result of high temperature. The prior art alternator had a delta winding wound on a stator core with 36 slots. It also had three positive and three negative diodes for each bridge mounted externally of the housing.

SUMMARY OF THE INVENTION

It is an object of the invention to provide an alternator that will provide the voltage and current required by a vehicle such as an ambulance to operate emergency equipment particularly during idle at low rpm.

It is a further object of the invention to provide means for dissipating the heat from the alternator to allow the diodes of the diode bridges to operate to produce a desired high output current.

The alternator of the invention uses a special stator winding, a specially wound rotor and three diode bridges each with eight diodes. Four positive diodes of each bridge are coupled in parallel and four negative diodes of each bridge are coupled in parallel. The diodes of each bridge are mounted on special heat sink plates secured on the outside and inside of the housing.

DESCRIPTION OF THE PREFERRED EMBODIMENT

Figure 1:
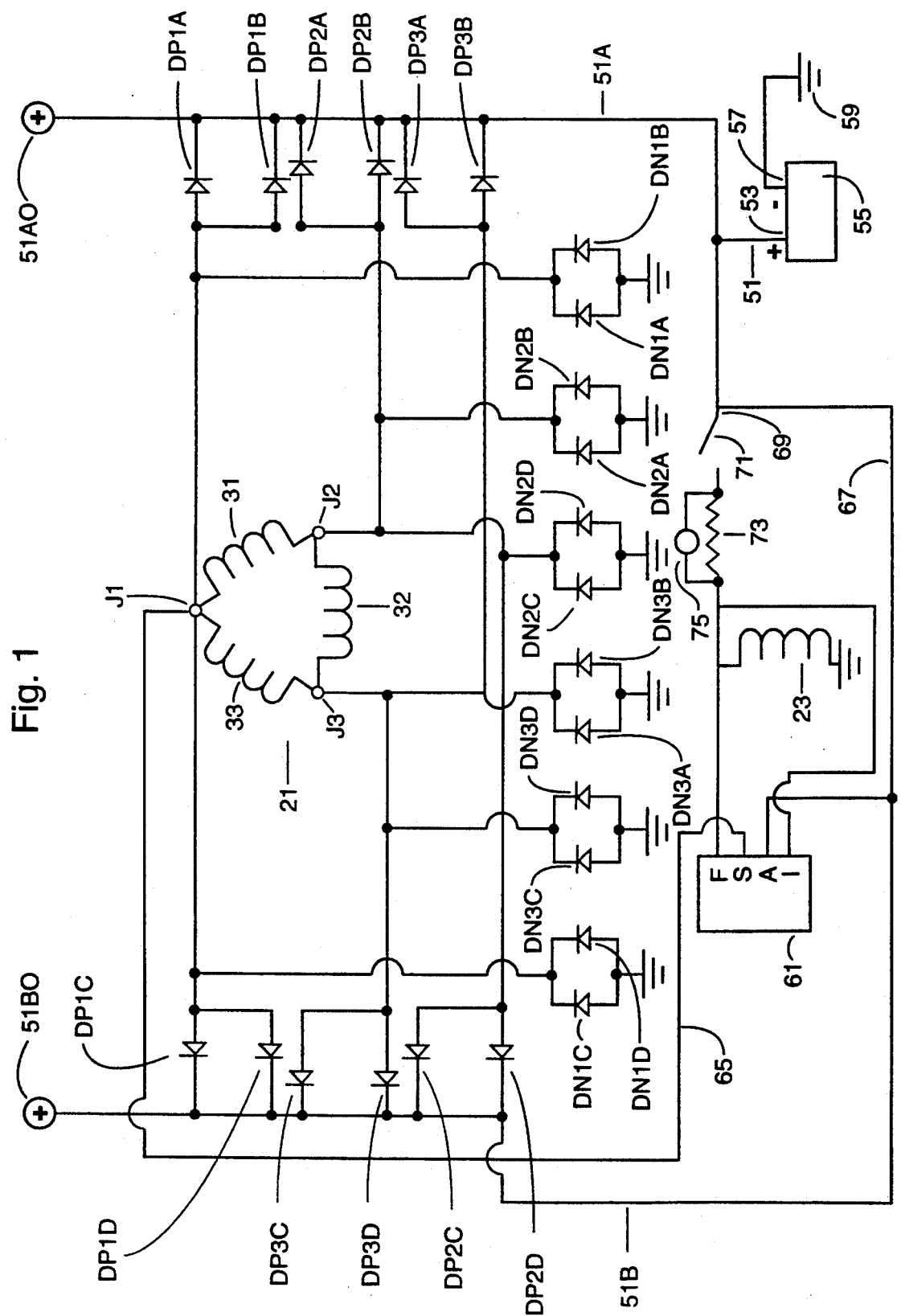
FIG. 1 is an electrical schematic of the alternator of the invention connected to a regulator and to a battery.
Figure 2:
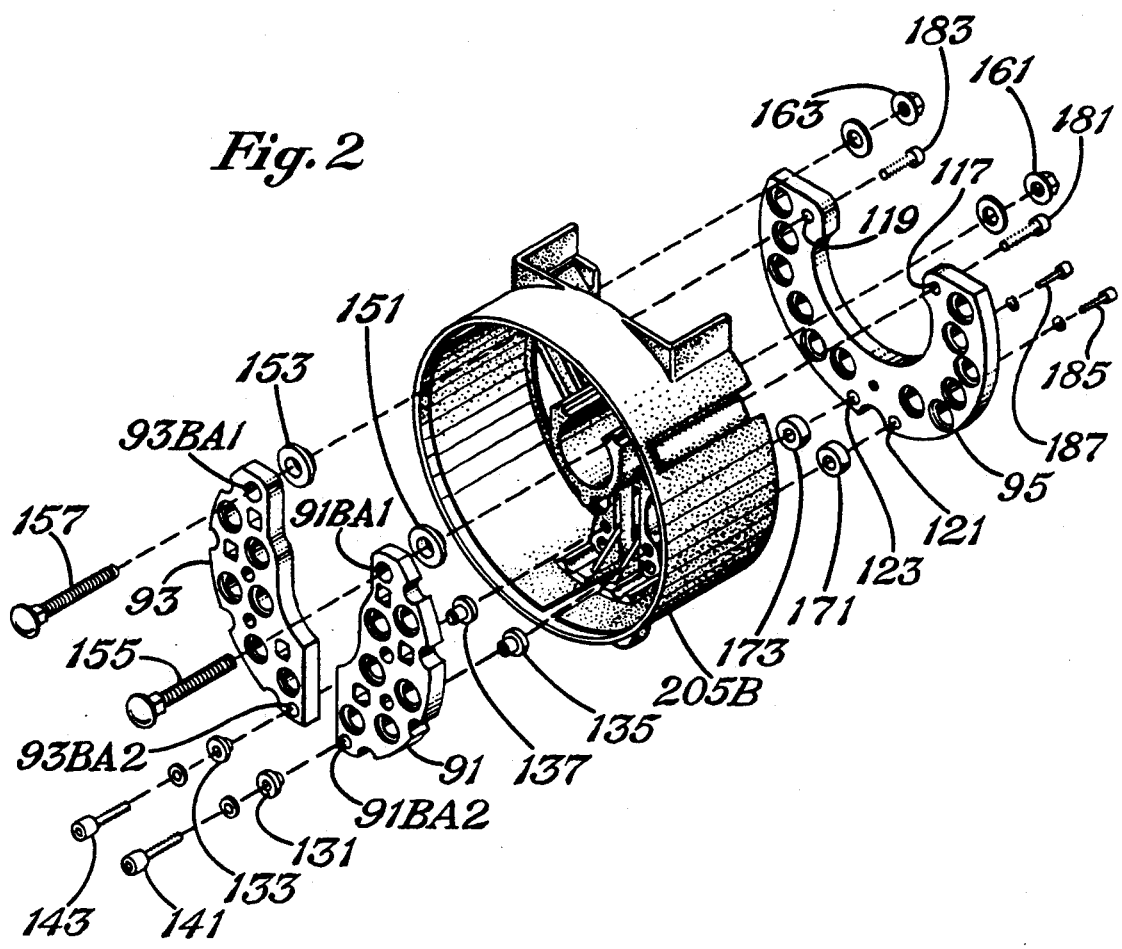
FIG. 2 is an exploded view of the housing of the alternator showing the diode support plates.
Figure 7:
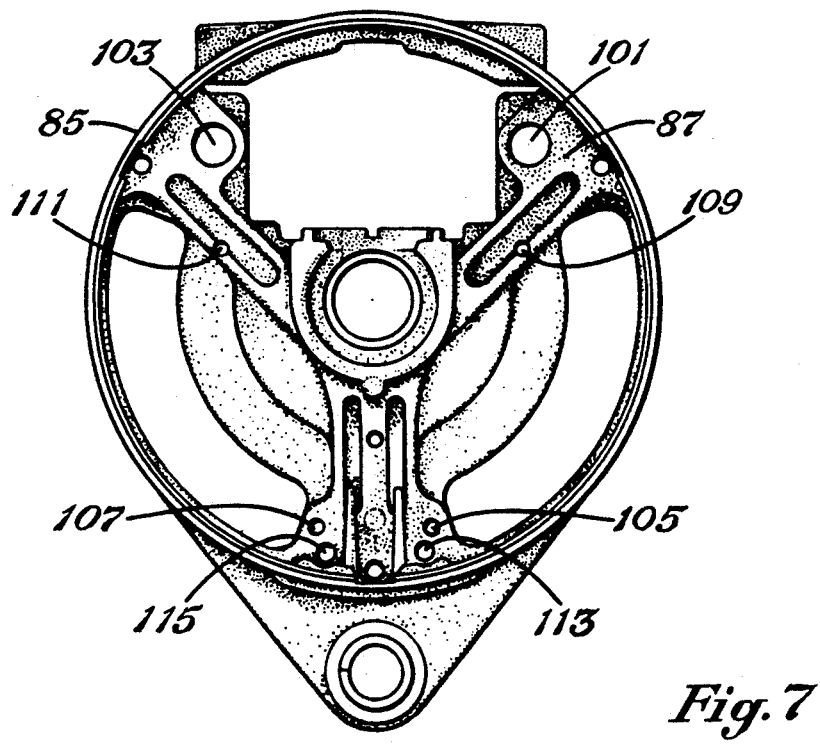
FIG. 7 is a plan view of the inside of the housing showing the rear wall without the two diode plates of FIGS. 3 and 4.
Figure 3:
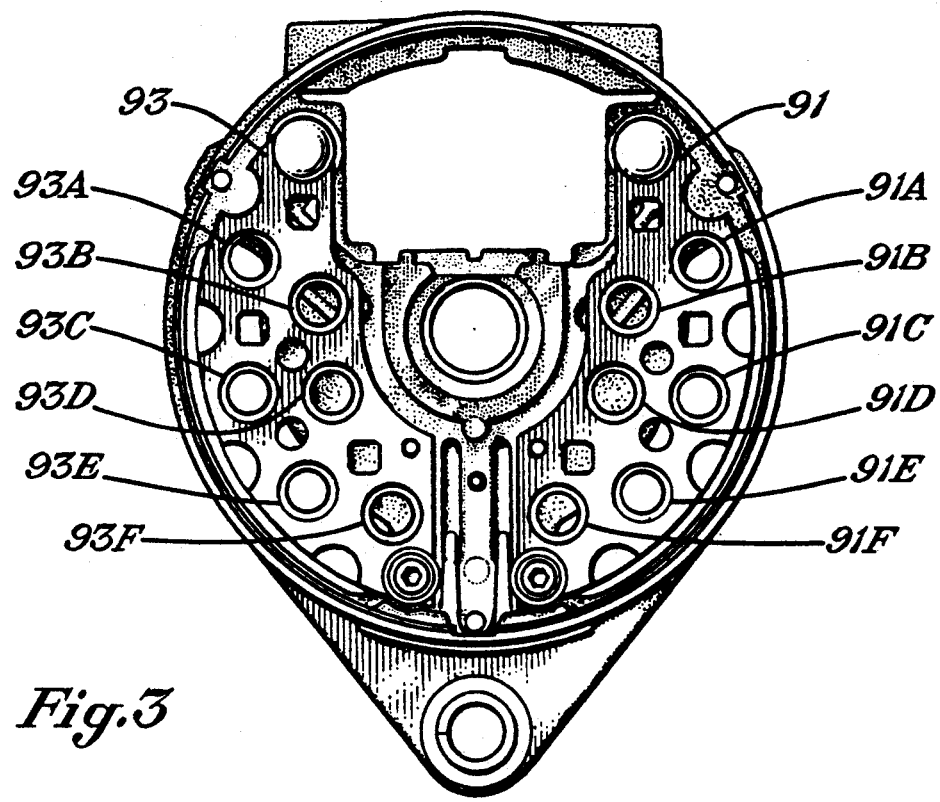
FIG. 3 is a plan view of the inside of the housing showing two diode support plates attached to the rear wall of the housing.
Figure 5:
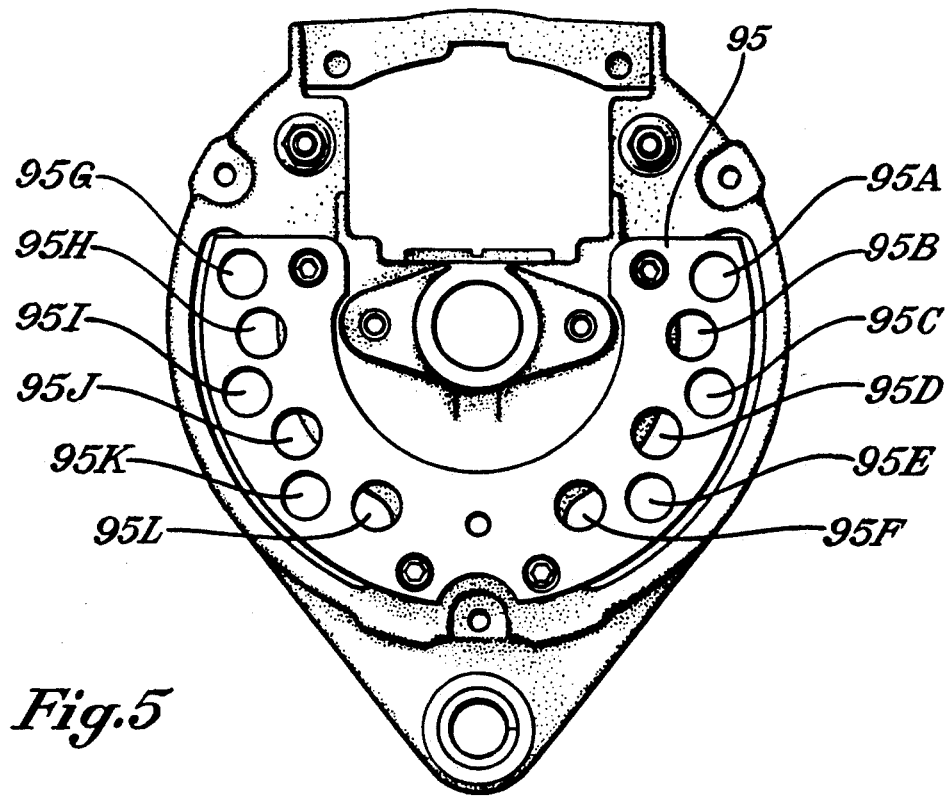
FIG. 5 is a plan view of the outside of the housing showing a diode support plate attached to the rear wall of the housing.
Figure 4:
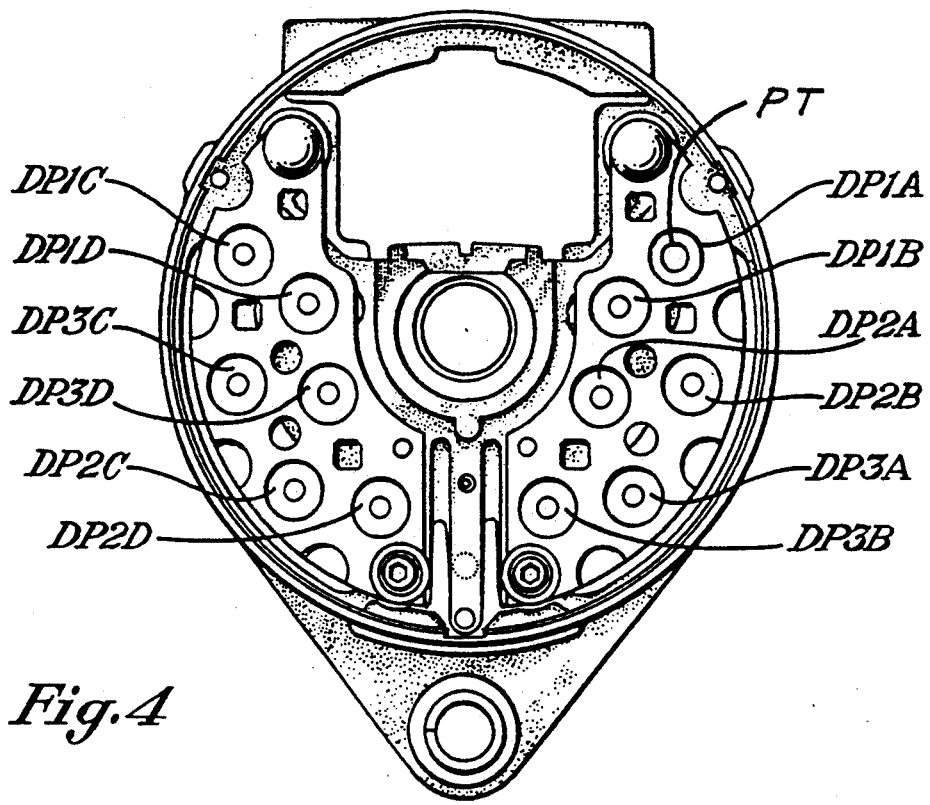
FIG. 4 is a view similar to that of FIG. 3 but with diodes located in the diode support plates.

Referring now to FIG. 1 of the drawings the alternator comprises a delta stator winding 21 and a rotor coil 23. The winding 21 is formed of three coils 31, 32, and 33 with the ends of adjacent coils electrically connected together at junctions J1, J2, and J3. Three diode bridges are connected to junctions J1, J2, and J3 respectively and to a lead 51 which is connected to the plus terminal 53 of a 12 volt battery 55. The negative terminal 57 of the battery 55 is connected to ground 59. Each diode bridge comprises four positive diodes having their positive sides connected to the associated junction of the winding 21 and their negative sides tied to the plus terminal of the battery 55 and four negative diodes having their negative sides tied to the associated junction of the winding 21 and their positive sides tied to ground 59. One bridge comprises four positive diodes DP1A, DP1B, DP1C, and DP1D and four negative diodes DN1A, DN1B, DN1C, and DN1D. The second bridge comprises four positive diodes DP2A, DP2B, DP2C, and DP2D and four negative diodes DN2A, DN2B, DN2C, and DN2D. The third bridge comprises four positive diodes DP3A, DP3B, DP3C, and DP3D and four negative diodes DN3A, DN3B, DN3C, and DN3D. Lead 51A is connected to diodes DP1A, DP1B, DP2A, DP2B, DP3A, and DP3B and has one end connected to lead 51 and an opposite end connected to an output terminal 51A0. Lead 51B is connected to diodes DP1C, DP1D, DP3C, DP3D, DP2C, and DP2B and has one end connected to lead 51 and an opposite end connected to an output terminal 51B0. Each bridge acts as a full wave rectifier. In each bridge all positive diodes are in parallel and all negative diodes are in parallel. Reference is made to U.S. Pat. No. 4,720,645 for definitions of positive and negative diodes and this patent is incorporated into this application by reference. In FIG. 4, the small circles within the diodes represent the pin terminals identified at PT in diode DP1A.

A regulator 61 is provided having terminals F, S, A, and I. The F terminal is connected to one end of the rotor coil 23 which has its other end connected to ground. The S terminal is connected by lead 65 to the winding 21; the A terminal is connected by lead 67 to lead 51 and the I terminal is connected by lead 69 to lead 51. Lead 69 includes a switch 71 and a resistor 73 with a bulb 75 connected across the resistor.

In operation, when the switch 71 is closed, current is applied to the I terminal of the regulator 61 which then goes to the F terminal resulting in about one volt across the rotor coil 23. When the rotor begins to rotate, voltage will appear on the S terminal and the A and F terminals are electrically coupled together and the I terminal is released. Current flow from the A terminal regulates the output at 14 volts. If the voltage is increased or reduced, the voltage on the rotor is reduced or increased respectively to maintain 14 volts across the battery. The regulator may be located inside or outside of the alternator housing.

As shown in FIGS. 2–7, the rear portion 205B of the housing 205 comprises a metal cylindrical side wall 85 having a metal rear wall 87. Two aluminum heat sink plates 91 and 93 are mounted to the inside of the rear wall 87 and a third aluminum heat sink plate 95 is mounted to the outside of the rear wall 87. Plate 91 has six apertures 91A-91F for receiving six of the positive diodes DP1A, DP1B, DP2A, DP2B, DP3A, and DP3B respectively which are press fitted in the apertures. Plate 93 has six apertures 93A-93F for receiving the other six positive diodes DP1C, DP1D, DP3C, DP3D, DP2C, and DP2D respectively which are press fitted in the apertures. Plate 95 has twelve apertures 95A-95L for receiving the twelve negative diodes DN1A, DN1B, DN2A, DN2B, DN2C, DN2D, DN1C, DN1D, DN3C, DN3D, DN3A, and DN3B respectively which are press fitted in the apertures.

Thus plate 91 supports the positive diodes of three of the bridges; plate 93 supports the positive diodes of three of the bridges; and plate 95 supports the negative diodes of all three of the bridges. The casings and hence the cathodes of the positive diodes thus are electrically connected to the plates 91 or 93 within which they are supported which plates in turn are electrically insulated from the case 205. The casings and hence the anodes of the negative diodes thus are electrically connected to the plate 95 which in turn is electrically connected to the case 205 and hence to ground.

The three plates 91, 93, and 95 dissipate the heat and provides support for the twenty-four diodes of the three bridges allowing the positive diodes of each bridge to be connected in parallel and the negative diodes of each bridge to be connected in parallel. This structure and arrangement maintains the temperature of the alternator under 200 degrees F. and the temperature of the diode bridges under 240 degrees F. Thus the system maintains a low temperature to sustain a high current alternator rotor output of 210 amps at 6,000 rpm and 150 amps at idle.

Referring to FIGS. 2-7, the rear wall 87 of the case member 205B has large diameter apertures 101 and 103 formed therethrough and three sets of threaded apertures 105 and 107, 109 and 111, and 113 and 115 formed therethrough. Plate 91 has bolt receiving apertures 91BA1 and 91BA2 and plate 93 has bolt receiving apertures 93BA1 and 93BA2 formed therethrough. Plate 95 has two sets of apertures 117 and 119 and 121 an 123 formed therethrough. Washer members 131 and 133 and 135 and 137 are electrical insulators. Plates 91 and 93 are secured to the inside wall 87 of case member 205B by inserting the small ends of members 131 and 135 into aperture 91BA2 and the small ends of members 133 and 137 into aperture 93BA2 and inserting bolts 141 and 143 through members 131 and 135 and 133 and 137 and screwing the bolts 141 and 143 into apertures 105 and 107 respectively. Members 131 and 135 and 133 and 137 prevent electrical contact of the bolts 141 and 143 and the wall 87 with plates 91 and 93.

Figure 11:
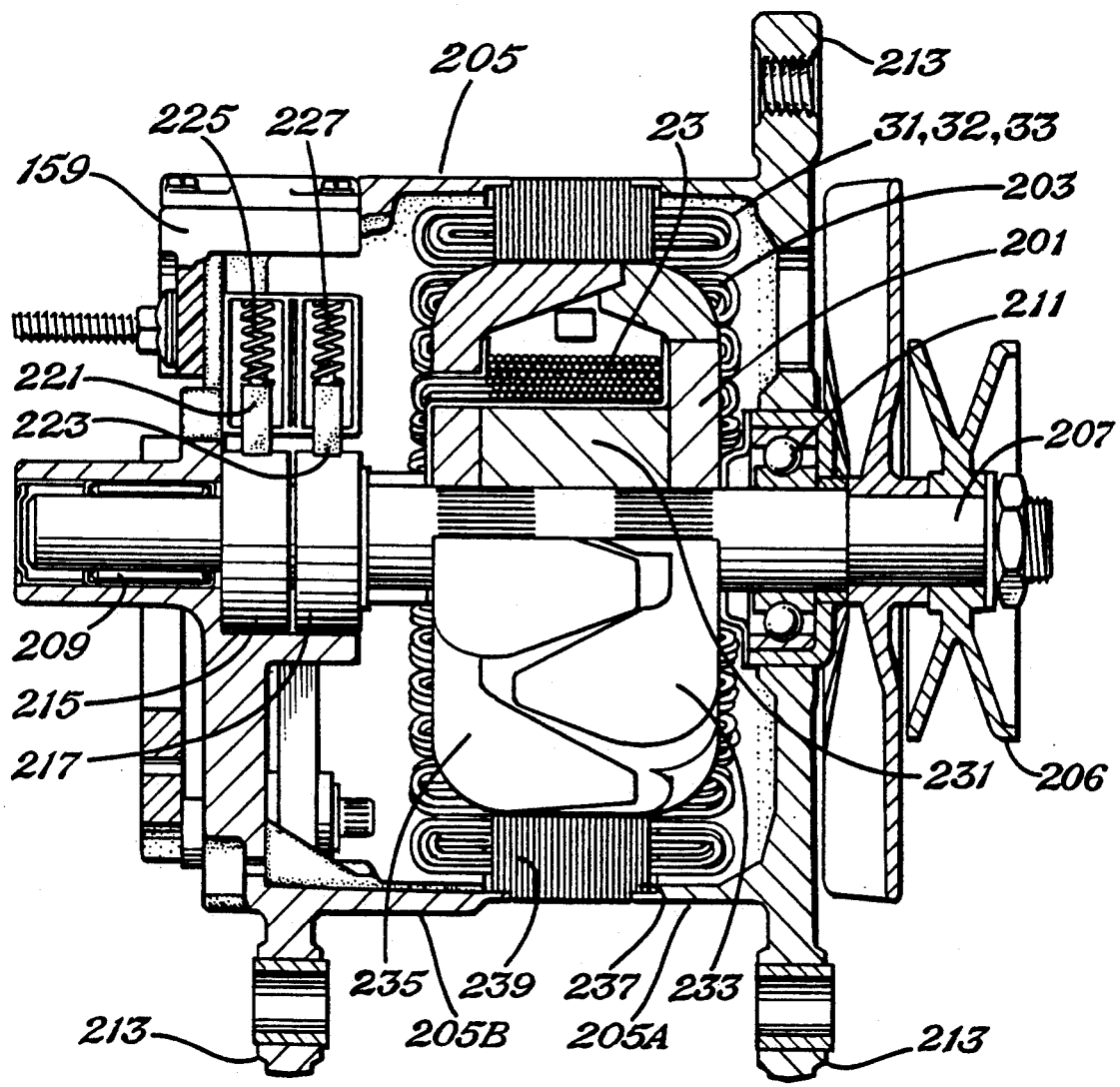
FIG. 11 is a cross-sectional view of the alternator showing its rotor supported for rotation within the stator.

Washer members 151 and 153 are electrical insulators. Bolts 155 and 157 are inserted through apertures 91BA1 and 93BA1 of plates 91 and 93, through members 151 and 53; through apertures 101 and 103 of wall 87 and through apertures (not shown) formed through a plastic member 159 which is L-shaped in cross-section as shown in FIG. 11. Nuts 161 and 163 are screwed to the bolts 155 and 157. Members 151 and 153 electrically insulate the plates 91 and 93 from the wall 87 and apertures 101 and 103 are large enough in diameter such that the bolts 155 and 157 cannot contact the inside walls of the apertures 101 and 103. Plastic member 159 is an electrical insulator. The outside ends of bolts 155 and 157 serve as the dual output terminals 51AO and 51BO.

Members 171 and 173 are metal spacers. Plate 95 is secured to the outside of wall 87 by inserting bolts 181 and 183 through apertures 117 and 119 and screwing the bolts into threaded apertures 109 and 111 of wall 87 and bolts 185 and 187 through apertures 121 and 123, through spacers 171 and 173 and screwing them into apertures 113 and 115 of wall 87.

Figure 6:
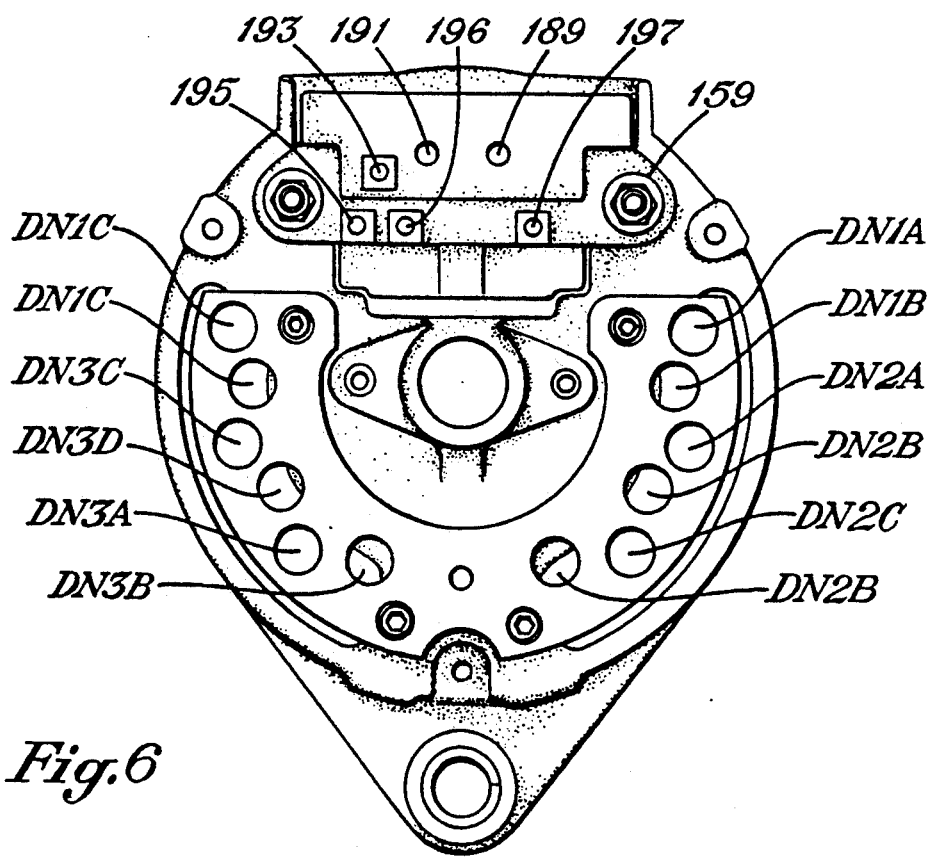
FIG. 6 is a view similar to that of FIG. 5 but with diodes located in the diode support plate.
Figure 8:
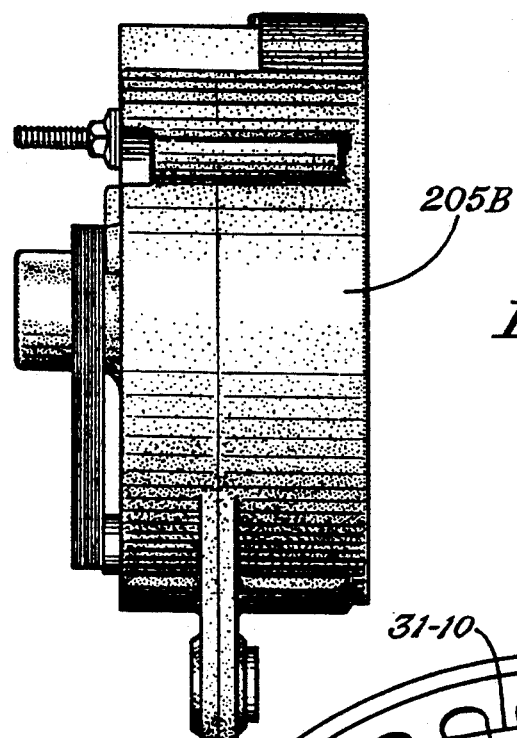
FIG. 8 is a side view of the housing showing the diode plate of FIGS. 5 and 7.

In FIG. 6, apertures 189 and 191 are for battery and ground leads, connection 193 is for coupling to the ignition lead and leads 195, 196, and 199 are for stator tap leads if such connections are desired.

Figure 10:
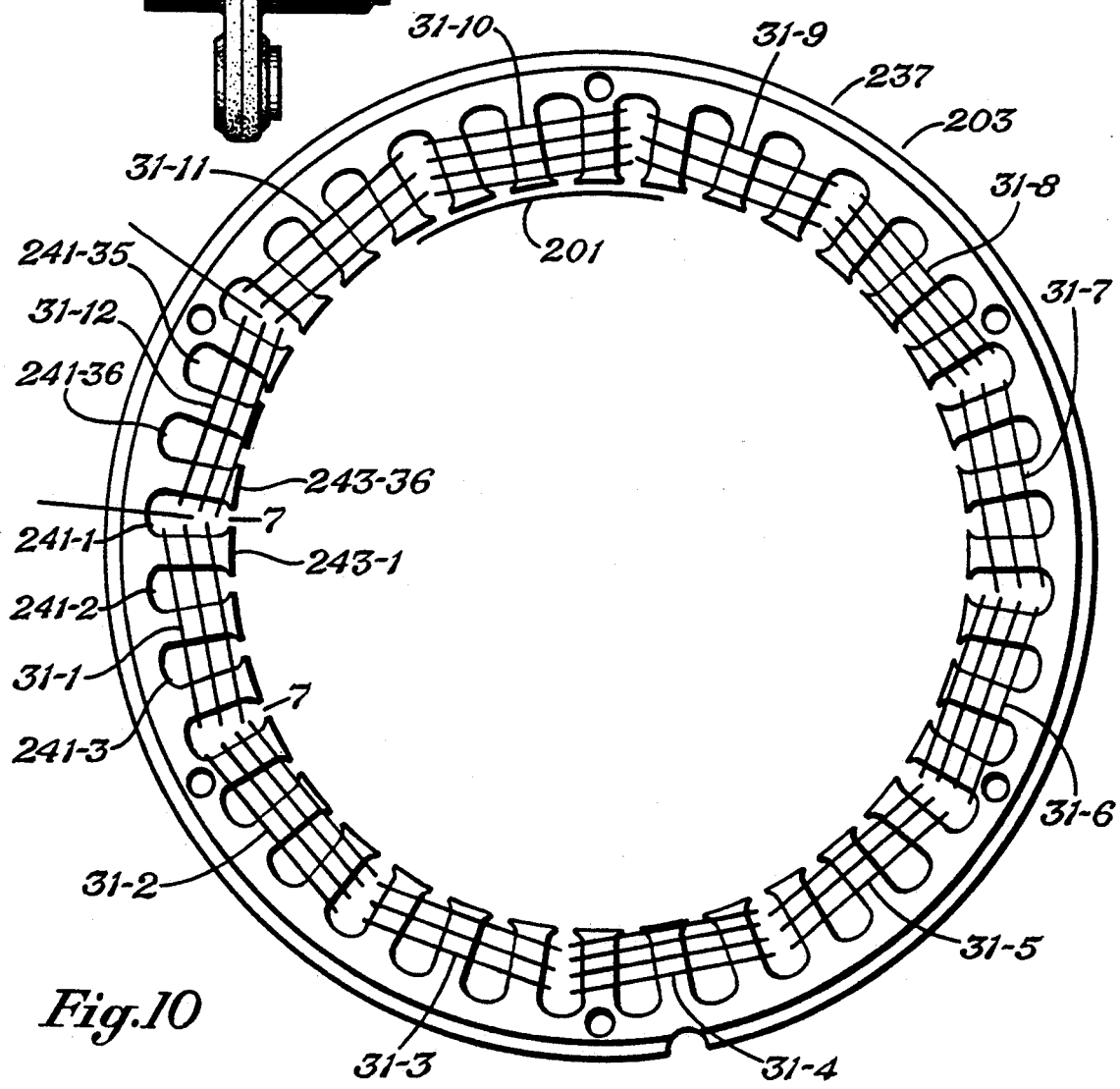
FIG. 10 is a plan view of the stator of the alternator showing one coil located in its slots.

Referring now to FIG. 11 there will be described more details of the internal components of the alternator. It comprises a rotor 201 and a stator 203, the latter of which is fixedly carried by the housing or case 205 comprising front and rear portions 205A and 205B secured together by bolts (not shown). Rotor 201 is rotatably carried by a shaft 207 which is journaled by roller bearings 209 and ball bearings 211 to the case 205. Brackets 213 formed to the case 205 are adapted to receive bolts for coupling the alternator to mounting means adjacent the engine of the vehicle. A pulley 206 is mounted to the shaft 207 for receiving the belt from the engine for rotating the rotor 201. A portion of the rotor 201 is illustrated in FIG. 10.

Shaft 207 has two slip rings 215 and 217 mounted rigidly to it and insulated from each other and from the shaft. Slip rings 215, 217 are connected by conductors (not shown) to the coil 23 of rotor 201. Carbon brushes 221 and 223 are biased by springs 225 and 227 into sliding contact with the slip rings 215 and 217. Slip rings applying a D.C. exiting voltage to the rotor 201 as obtained from the diode bridges.

Rotor 201 comprises a ferro-magnetic core 231 which is wound with conductive wire defining the rotor coil 23. The opposite sides of the core 231 have end portions which form north and south poles 233 and 235. The poles extend inward and mesh, but do not touch, with a corresponding pole of the opposite polarity.

Stator 203 comprises an annular core 237 formed of a plurality of stacked ferro-magnetic plates 239. A plan view of the core 237 is shown in FIG. 10. As seen in this figure, there are thirty-six slots 241 formed in the stator core 237. Slots 241 extend parallel to the axis of the core 237 the full width of the core.

In the preferred embodiment, the depth of the slots 241 is slightly more than one half of the radial thickness of the core. The core 237 is approximately 6 ½ inches in outside diameter, 15/16 of an inch wide longitudinally and has an inside diameter of 4.7675 inches. The slots 241 are approximately ½ of an inch deep, being about ⅛ of an inch wide at the entrance and about ¼ of an inch wide at the inner portion. The thirty-six portion of the core between the slots 241 are defined as segments 243. Rotor 201 is supported within the stator core 237, with the poles 233 and 235 being spaced from segments 243.

The distance between the outside of the rotor 201 and the inside of the stator core 237 is equal to about 0.00125 of an inch. This close spacing increases the current output of the alternator.

The three stator windings 31-33 each comprise twelve loops or coils which are located in the slots 241 of the core 237. Each coil or loop of each winding encircles three segments 243 of the core. Electrically insulating inserts (not shown) are located in the slots between their wall structure and their wires to prevent electrical contract between the wires and the core. The stator windings are connected in a delta configuration as shown in FIG. 1.

Figure 9:
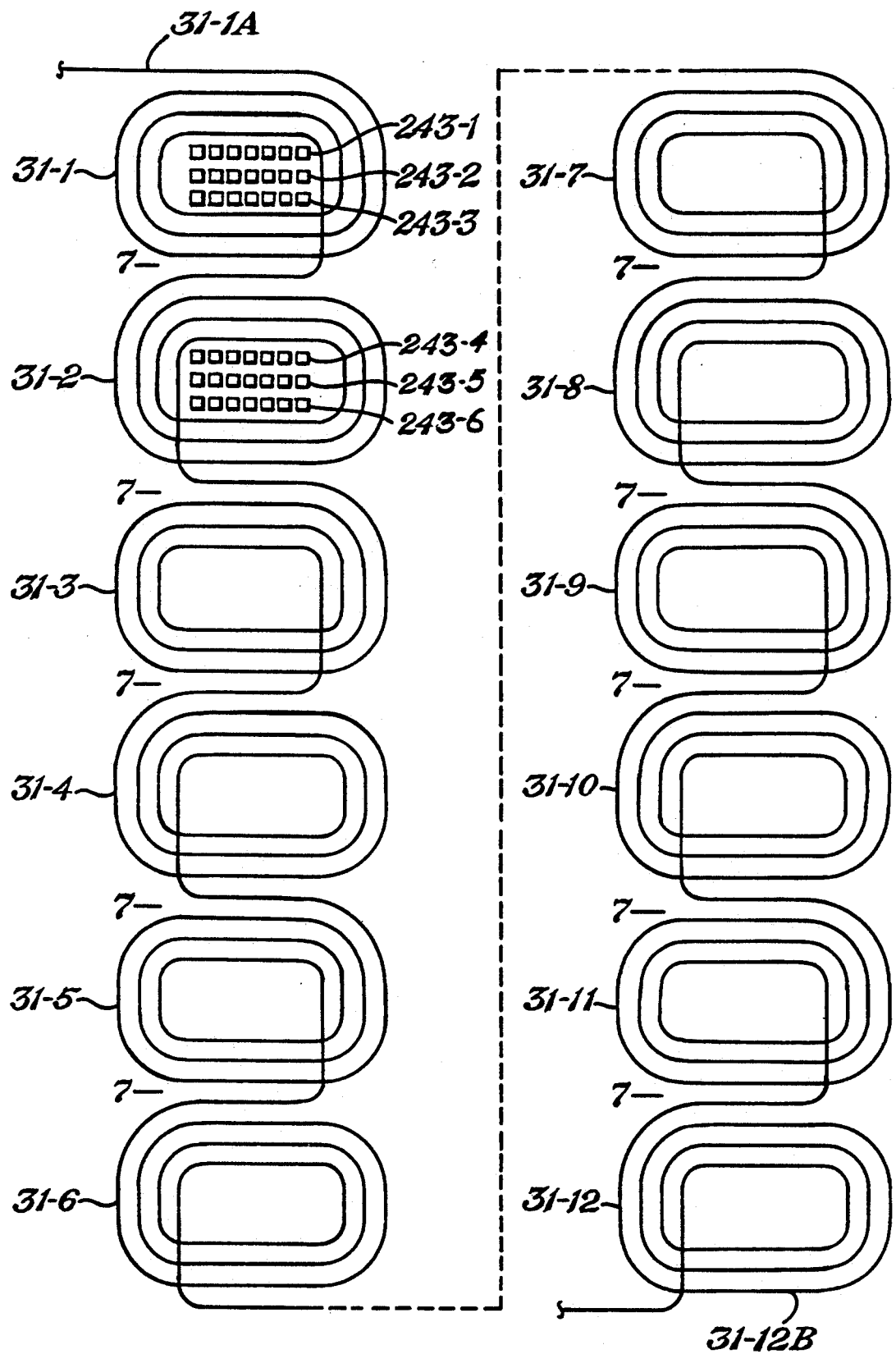
FIG. 9 illustrates one coil of the alternator of the invention.

The alternator used in the system of FIG. 1 has a desired coil winding configuration of each of its three coil windings which results in the production of voltage and current that will meet all of the requirements of an ambulance at low engine idle rpm. This coil winding configuration is shown in FIG. 9 and 10. Twelve A.W.G. (American Wire Gage) copper wire is used to form the windings 31, 32, and 33 which are connected together in a delta configuration.

Referring to FIGS. 9 and 10, the coil winding configuration will be described. The coil winding in these figures is for one phase and it is identified as winding 31 of the alternator. The coil winding configuration for the other two phases, coil windings 32 and 33 is the same as that of coil winding 31. As seen in FIG. 9, the outer edge 31-1A of coil 31-1 has four turns of wire. The outer edge 31-12B of coil 31-12 has three turns of wire. The total turns formed between adjacent coils, from adjacent coils 31-1 and 31-2 to adjacent coils 31-12 and 31-11 are as follows: 7, 7, 7, 7, 7, 7, 7, 7, 7, 7, 7, 7. The turns of the left hand edges of coils 31-1 to 31-12 as seen in FIG. 9 are as follows: 3, 4, 3, 4, 3, 4, 3, 4, 3, 4, 3, 3. The turns of the right hand edges of coils 31-1 to 31-12 as seen in FIG. 9 are as follows: 4, 3, 4, 3, 4, 3, 4, 3, 4, 3, 4, 3.

In the stator core of FIG. 10, edges 31-1A and 31-12B of the coil winding 31 are located in slot 241-1. Starting with slot 241-1 and going counterclockwise, it can be seen that every fourth slot has the following number of turns of windings 31 located therein: 7, 7, 7, 7, 7, 7, 7, 7, 7, 7, 7, 7. With the turns of coil 31 so located in every fourth slot, each coil of winding 31 will encircle three segments.

In FIG. 10, only the edge of the coil winding 31 having the turns 3, 4, 3, 4, 3, 4, 3, 4, 3, 4, 3, 3 is shown. In FIG. 9, core segments 243-1, 243-2, and 243-3 encircled by coil 31-1 and core segments 243-4, 243-5 and 243-6 encircled by coil 31-2 are depicted by dotted lines.

Each of the coil windings 32 and 33 is the same as coil winding 31. The turns of adjacent coils of windings 32 will be located in every fourth slot starting with slot 241-36 and going counterclockwise. The outer edges of the end coils of winding 32 will be located in slot 241-36. Thus starting with slot 243-36 and going counterclockwise, every fourth slot will have the following number of turns of winding 32 located therein: 7, 7, 7, 7, 7, 7, 7, 7, 7, 7, 7, 7. With the turns of the coils so located in every fourth slot, each coil or loop of winding 32 will encircle three segments 243.

The turns of adjacent coils of winding 33 will be located in every fourth slot starting with slot 241-35 and going counterclockwise. The outer edges of the end coils of winding 33 will be located in slot 241-35. Thus starting with slot 241-35 and going counterclockwise, every fourth slot will have the following number of turns from winding 33 located therein: 7, 7, 7, 7, 7, 7, 7, 7, 7, 7, 7, 7. With the turns of coil 33 so located in every fourth slot, each coil or loop of winding 33 will encircle three segments 243. The alternator having the three winding configuration as described in connection with FIGS. 9 and 10, connected in a delta and formed of twelve A.W.G. copper wire will produce about 150 amps at the engine idle speed of 750-850 rpm and about 210 amps at 6,000 rotor rpm.

The rotor has an outside diameter of 4.7650 inches and the stator has an inside diameter of 4.7675 inches. The rotor is a 2.8 ohm rotor with 0.00125 of an inch clearance between the rotor and stator. Each of diodes is rated at 50 amps and a temperature of about 300 degrees F. About about 300 degrees F. the diodes will fail.

What is claimed is:

1. An alternator for a motor vehicle, comprising:

a metal housing having an annular side wall and two end walls, an annular stator core supported in said metal housing in a stationary position relative to said metal housing, said core having thirty-six segments with adjacent segments being separated by a slot such that there are thirty-six slots, a rotor supporting a rotor winding located concentrically within said annular stator core, means for supporting said rotor for rotation relative to said annular stator core with the distance between the outside of said rotor and the inside of said stator core being equal to about 0.00125 of an inch, said rotor winding being rated at about 2.8 ohms, a three phase stator winding connected in a delta configuration such that the end of each coil is connected to the end of another coil at a junction forming three junctions, each phase comprising a winding having twelve coils extending around said stator core on the inside thereof, each of said coils of each phase winding comprising a plurality of turns of wire encircling three segments, said twelve coils of each phase winding having a plurality of turns located in twelve of said slots such that said twelve slots for each phase winding respectively have the following number of turns located therein 7, 7, 7, 7, 7, 7, 7, 7, 7, 7, 7, 7, said twelve coils of each phase winding respectively having the following number of turns at one edge of said winding located outside of said slots on one side of said core 3, 4, 3, 4, 3, 4, 3, 4, 3, 4, 3, 3, said twelve coils of each phase winding respectively having the following number of turns at the other edge of said winding located outside of said slots on the other side of said core, 4, 3, 4, 3, 4, 3, 4, 3, 4, 3, 4, 3, each of said windings being formed of 12 America Wire Gage electrically conductive wire.

2. The alternator of claim 1, comprising:

three diode bridges, each of which is connected to one of said three junctions, each diode bridge comprising a plurality of positive diodes connected in parallel and a plurality of negative diodes connected in parallel, first and second metal heat sink plates attached to the inside of one of said end walls, a third metal heat sink plate attached to the outside of said one end wall, each of said plates supporting diodes of at least two of said bridges.

3. The alternator of claim 2, wherein:

said plurality of said positive diodes of each of said bridges comprises four positive diodes, said plurality of said negative diodes of each of said bridges comprises four negative diodes.

4. The alternator of claim 3, comprising:

first and second output members, two of said positive diodes and two of said negative diodes of each of said bridges being coupled to said first output member, and the other of said two of said positive diodes and the other of said two of said positive diodes of each of said bridges being coupled to said second output member.

5. An alternator for a motor vehicle, comprising:
a metal housing having an annular side wall and two end walls,
an annular stator core supported in said metal housing in a stationary position relative to said metal housing,
a rotor supporting a rotor winding located concentrically within said annular stator core,
means for supporting said rotor for rotation relative to said annular stator core,
a three phase stator winding connected in a delta configuration such that the end of each coil is connected to the end of another coil at a junction forming three junctions,
each phase comprising a winding having a given number of coils extending around said stator core on the inside thereof,
three diode bridges each of which is connected to one of said three junctions,
each diode bridge comprising a plurality of positive diodes connected in parallel and a plurality of negative diodes connected in parallel,
first and second metal heat sink plates attached to the inside of one of said end walls,
a third metal heat sink plate attached to the outside of said one end wall,
each of said plates supporting diodes of at least two of said bridges.

6. The alternator of claim 5, wherein:
said plurality of said positive diodes of each of said bridges comprises four positive diodes,
said plurality of said negative diodes of each of said bridges comprises four negative diodes.

7. The alternator of claim 6, comprising:
first and second electrical output members,
two of said positive diodes and two of said negative diodes of each of said bridges being coupled to said first output member, and
the other of said two of said positive diodes and the other of said two of said positive diodes of each of said bridges being coupled to said second output member.

8. The alternator of claim 7, wherein:
six of said positive diodes are supported by said first heat sink plate, six of said positive diodes are supported by said second heat sink plate, and all twelve of said negative diodes are supported by said third heat sink plate.

* * * * *